United States Patent
Katsuyama et al.

(10) Patent No.: US 9,382,959 B2
(45) Date of Patent: Jul. 5, 2016

(54) ELECTRIC BRAKING DEVICE FOR VEHICLE

(71) Applicants: ADVICS CO., LTD., Kariya-shi, Aichi-ken (JP); Yazaki Corporation, Tokyo (JP)

(72) Inventors: Tomonori Katsuyama, Toyoake (JP); Shinichiro Yukoku, Seto (JP); Satoshi Hirata, Kariya (JP); Motoshi Suzuki, Nagoya (JP); Kenichi Ikeya, Susono (JP); Takamichi Kudo, Susono (JP)

(73) Assignees: ADVICS CO., LTD., Aichi-ken (JP); YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/499,793

(22) Filed: Sep. 29, 2014

(65) Prior Publication Data

US 2015/0090540 A1   Apr. 2, 2015

(30) Foreign Application Priority Data

Sep. 30, 2013   (JP) ................. 2013-204696

(51) Int. Cl.
| | |
|---|---|
| F16D 65/14 | (2006.01) |
| F16D 65/18 | (2006.01) |
| B60T 13/74 | (2006.01) |
| F16D 121/24 | (2012.01) |
| F16D 125/40 | (2012.01) |
| F16D 125/48 | (2012.01) |

(52) U.S. Cl.
CPC ............... *F16D 65/18* (2013.01); *B60T 13/741* (2013.01); *F16D 2121/24* (2013.01); *F16D 2125/40* (2013.01); *F16D 2125/48* (2013.01)

(58) Field of Classification Search
CPC . F16D 65/14; F16D 65/0068; F16D 2121/18; F16D 2121/24
See application file for complete search history.

(56) References Cited

U.S. PATENT DOCUMENTS

| | | |
|---|---|---|
| 2003/0083797 A1 | 5/2003 | Yokoyama et al. |
| 2006/0021832 A1 | 2/2006 | Usui et al. |
| 2006/0163013 A1 | 7/2006 | Rieth et al. |

(Continued)

FOREIGN PATENT DOCUMENTS

| | | |
|---|---|---|
| DE | 102004012355 A1 | 9/2004 |
| DE | 102007036070 A1 | 2/2009 |
| EP | 1308321 A1 | 5/2003 |
| EP | 1750030 A1 | 2/2007 |
| EP | 1914439 A2 | 4/2008 |
| EP | 1975448 A1 | 10/2008 |
| JP | 2006103562 A | 4/2006 |
| JP | 2007232045 A | 9/2007 |
| WO | 2004016965 A1 | 2/2004 |
| WO | 2004044445 A2 | 5/2004 |

OTHER PUBLICATIONS

Extended European Search Report issued on Apr. 11, 2016 by the European Patent Office in counterpart European Application No. 14186749.9.

*Primary Examiner* — Vishal Sahni
(74) *Attorney, Agent, or Firm* — Sughrue Mion, PLLC (57) ABSTRACT

There is provided an electric braking device for a vehicle, which includes a brake caliper which is provided to a wheel, a pressing member which is provided to the brake caliper and is driven to press a friction member to a rotary member fixed to the wheel, an electric motor which is a power source to drive the pressing member, an electric power/signal line which supplies electric power to the electric motor or allows a first electric circuit provided in a vehicle body to communicate with a second electric circuit provided in the brake caliper, and a connector which relays the electric power line. The connector includes a terminal joining portion which joins one terminal and another terminal to each other, and the one terminal and the another terminal are made of metal. The terminal joining portion is positioned inside the brake caliper.

4 Claims, 7 Drawing Sheets

(56) References Cited

U.S. PATENT DOCUMENTS

| | | |
|---|---|---|
| 2006/0180413 A1 | 8/2006 | Halasy-Wimmer et al. |
| 2007/0034459 A1 | 2/2007 | Matsushita et al. |
| 2007/0199775 A1 | 8/2007 | Yasukawa |
| 2007/0228824 A1* | 10/2007 | Yasukawa ............... B60T 13/02 303/171 |
| 2008/0091326 A1 | 4/2008 | Watanabe et al. |

* cited by examiner

ELECTRIC BRAKING DEVICE FOR VEHICLE

CROSS REFERENCE TO RELATED APPLICATIONS

This application is based on and claims priority under 35 U.S.C. §119 to Japanese Patent Application 2013-204696, filed on Sep. 30, 2013, the entire content of which is incorporated herein by reference.

TECHNICAL FIELD

The present invention relates to an electric braking device mounted on a vehicle.

BACKGROUND

JP-A-2007-232045 discloses a brake control device having an integrated structure in which an electric circuit unit is provided to a brake force generation unit of a brake device, and for the purpose of improving vibration resistance and heat resistance, an opening is provided in a case on a circuit side and a connection portion is arranged in a space inside the opening. JP-A-2007-232045 also discloses that a harness provided with an electric power line and a first signal line, and the electric circuit unit are connected by a connector (refer to FIG. 8) and the connector and a cover are integrally formed (refer to FIG. 9).

Incidentally, in an electric braking device in which an electric motor and a drive circuit are provided to a wheel and braking torque is generated by supplying electric power from a vehicle body side, there has been desired for not only improvement of vibration resistance and heat resistance but also consideration on flying stones and the like and improvement of water resistance. For example, when a vehicle travels on an unpaved road, small stones are kicked up due to rotations of wheels, thereby colliding with each member inside a wheel house. Further, when each member is wet, water remains in a concave portion or a corner portion for a long period and gradually intrudes into the device. Particularly, when supplying electric power and/or a control signal via a connector, it may be important to provide countermeasures against flying stones and water intrusion around the connector.

SUMMARY

The present invention has been made in view of the above circumstances, and an object of the present invention is to provide a technique which is effective to improve reliability of an electric braking device for a vehicle to which electric power and/or a signal is supplied via a connector, with respect to flying stones and the like.

According to an illustrative embodiment of the present invention, there is provided an electric braking device for a vehicle, which includes a brake caliper (CPR), a pressing member (PSN), an electric motor (MTR), an electric power line (PWL), and a connector (CNC). The brake caliper (CPR) is provided to a wheel (WHL). The pressing member (PSN) is provided to the brake caliper (CPR). The pressing member (PSN) is driven to press a friction member (MSB) to a rotary member (KTB) which is fixed to the wheel (WHL) and rotates together with the wheel (WHL). The electric motor (MTR) is a power source to drive the pressing member (PSN). The electric power line (PWL) supplies electric power to the electric motor (MTR) from electric power sources (BAT and ALT) which are fixed to a vehicle body (BDY) of the vehicle. The connector (CNC) relays the electric power line (PWL). The connector (CNC) includes a terminal joining portion (Sgp) which joins one terminal (TP1) and another terminal (TP2) to each other. The one terminal (TP1) and the another terminal (TP2) are made of metal. The terminal joining portion (Sgp) is positioned inside the brake caliper (CPR).

According to another illustrative embodiment of the present invention, there is provided an electric braking device for a vehicle, which includes a brake caliper (CPR), a pressing member (PSN), an electric motor (MTR), a signal line (SGL), and a connector (CNC). The signal line (SGL) allows a first electric circuit (ECU and ECV) provided in a vehicle body (BDY) of the vehicle to communicate with a second electric circuit (DRV, DFB, and DMK) provided in the brake caliper (CPR). The connector (CNC) relays the signal line (SGL). The connector (CNC) includes a terminal joining portion (Sgs) which joins one terminal (TS1) and another terminal (TP2) to each other. The one terminal (TS1) and the another terminal (TP2) are made of metal. The terminal joining portion (Sgs) is positioned inside the brake caliper (CPR).

According to each of the electric braking devices described above, a male side connector and a female side connector in a combination configuring the connector (CNC) are joined (are fit) to each other inside the brake caliper (CPR). Therefore, there is no need to individually provide a protection cover (a protector) to cope with flying stones and the like. The brake caliper (CPR) itself becomes a protective member for the connector (CNC). The size of a portion of the connector (CNC) exposed outside the brake caliper (CPR) may be suppressed to be minimum necessary, and thus, probability of damage to the connector (CNC), particularly to the terminal joining portions (Sgp and Sgs) may be decreased. Since the terminal joining portions (Sgp and Sgs) are arranged inside the brake caliper (CPR), it is possible to extend the length of a water-intrusion path through which water intrudes from the surface of the brake caliper (CPR) to the terminal joining portions (Sgp and Sgs). As a result, water resistance of the terminal joining portions (Sgp and Sgs) may be improved.

In each of the electric braking devices described above, it may be preferable that the brake caliper (CPR) include a case member (CAS) having a space to accommodate the terminal joining portions (Sgp and Sgs), and the terminal joining portions (Sgp and Sgs) be formed in the connector (CNC) by joining the another terminal (TP2 and TS2) which is introduced to the space of the case member (CAS) through an opening portion (Kkb) provided to penetrate the case member (CAS), to the one terminal (TP1 and TS1) which is arranged in the space of the case member (CAS). Here, the case member (CAS) is a portion of the brake caliper (CPR), and can be configured as a member having a box-type structure including a storing space therein. Therefore, the case member (CAS) itself which is a portion of the brake caliper (CPR) becomes the protective member of the connector (CNC). Moreover, it may be possible to extend the length of the water-intrusion path through which water intrudes from the surface of the brake caliper (CPR) to the terminal joining portions (Sgp and Sgs) through the opening portion (Kkb) of the case member (CAS).

According to the above configuration, it is possible to improve reliability of an electric braking device for a vehicle, to which electric power and/or a signal is supplied via a connector, with respect to flying stones and the like particularly by a technique of arranging a terminal joining portion of the connector at a favorable position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a brake control device for a vehicle according to illustrative embodiments of the present invention will be described with reference to the accompanying drawings.

Figure 1:
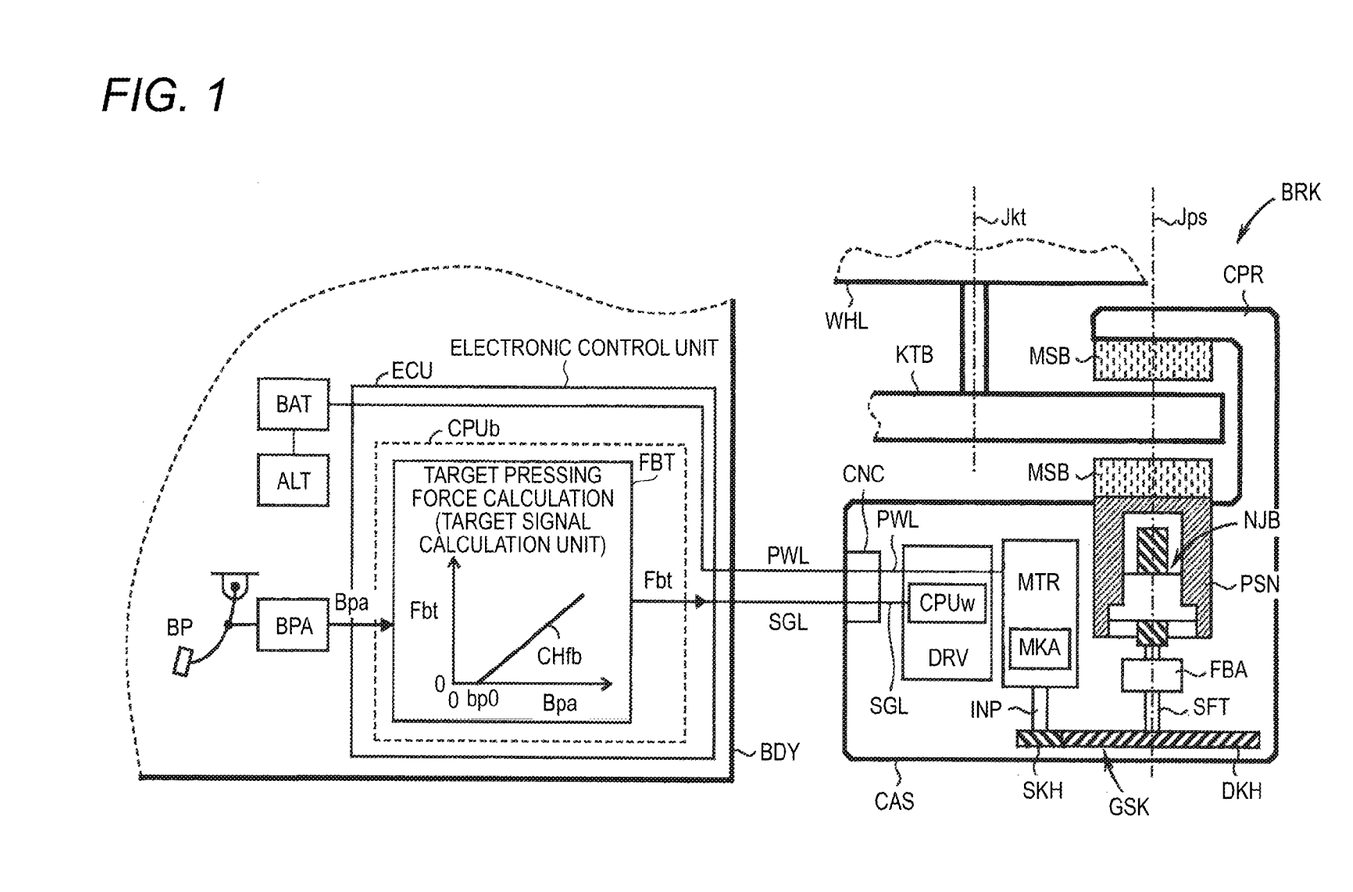
FIG. 1 is an overall configuration diagram showing an electric braking device according to a first illustrative embodiment.

As shown in FIG. 1, a vehicle including an electric braking device according to a first illustrative embodiment of the present invention is provided with a braking operation member BP, a braking operation amount acquisition unit BPA, an electronic control unit ECU, electric power sources BAT and ALT, and a braking unit (a brake actuator) BRK. The electric braking device is a device which is configured to generate braking torque on a wheel WHL of the vehicle.

The braking operation member BP is a member operated by a driver to reduce the speed of the vehicle. In response to an operation of the braking operation member BP by the driver, the braking torque of the wheel WHL is adjusted by the braking unit BRK. As a result, a braking force is generated in the wheel WHL, thereby reducing the speed of the traveling vehicle. Typically, a brake pedal which is operated by a brake pedal stepping force of the driver corresponds to the braking operation member BP.

The braking operation amount acquisition unit BPA is provided to the braking operation member BP. The braking operation amount acquisition unit BPA acquires (detects) an operation amount (a braking operation amount) Bpa of the braking operation member BP operated by the driver. As the braking operation amount acquisition unit BPA, at least one of a sensor configured to detect a pressure of a master cylinder (a pressure sensor), a sensor configured to detect an operation force of the braking operation member BP (a brake pedal stepping force sensor), and a sensor configured to detect a displacement amount of the braking operation member BP (a brake pedal stroke sensor) is employed. Accordingly, the braking operation amount Bpa is calculated based on at least one of the pressure of the master cylinder, the brake pedal stepping force, and a brake pedal stroke. The calculated braking operation amount Bpa is input to the electronic control unit ECU (specifically, a processor CPUb which is provided in the electronic control unit ECU).

The electronic control unit ECU has an electric circuit (a printed wiring board) including the processor CPUb and is fixed to a vehicle body BDY. Here, "the processor" is an electronic circuit, that is, "a central processing unit (CPU)" configured to execute calculation processing. Moreover, "the printed wiring board" is a plate-like component configuring the electronic circuit by fixing electronic components such as an integrated circuit, a resistor, and a capacitor to the surface thereof and connecting the electronic components through wiring. The electronic control unit ECU is an example of a first electric circuit of the present invention. In the processor CPUb of the electronic control unit ECU, a target signal calculation unit FBT is programmed. The target signal calculation unit FBT calculates a target pressing force (a target value) Fbt. The target value (a drive signal) Fbt to drive an electric motor MTR of the braking unit BRK is output to an drive circuit DRV from the electronic control unit ECU. The target pressing force Fbt is transmitted to the drive circuit DRV via a signal line SGL. Electric power to drive the electric motor MTR is supplied to the drive circuit DRV from a storage battery (a battery) BAT and the like via the electronic control unit ECU.

The storage battery BAT and an alternator (an electric dynamo) ALT configure an electric power source to supply electric power to the electronic control unit ECU, the drive circuit DRY, and the electric motor MTR. The electric power sources BAT and ALT are fixed to the vehicle body BDY. When a storage amount of the storage battery BAT decreases, the alternator ALT charges the storage battery BAT. Electric power (electric current) from the electric power sources BAT and ALT is supplied to the drive circuit DRV (eventually, to the electric motor MTR) via an electric power line PWL.

A target pressing force calculation block (the target signal calculation unit) FBT calculates the target pressing force (the target signal) Fbt of a force (a pressing force) of a friction member (a brake friction pad) MSB pressing a rotary member (a brake disk) KTB. The target pressing force calculation block FBT is a control algorithm and is programmed in the processor CPUb in the electronic control unit ECU. The target signal Fbt is calculated based on the braking operation amount Bpa and a preset calculation map CHfb. The target signal Fbt is transmitted to the drive circuit DRV fixed to the wheel WHL via the signal line SGL.

The braking unit (the brake actuator) BRK is provided to the wheel WHL so as to apply braking torque to the wheel WHL, thereby generating a braking force. For example, the braking unit BRK reduces the speed of the traveling vehicle. The braking unit BRK includes a brake caliper CPR, a pressing member PSN, the electric motor MTR, a position acquisition unit MKA, a reduction gear GSK, a shaft member SFT, a screw member NJB, a pressing force acquisition unit FBA, the drive circuit DRY and a connector CNC.

The brake caliper (simply referred to as "caliper") CPR is provided (allocated) to the wheel WHL. The caliper CPR is an example of a brake caliper of the present invention. As the caliper CPR, a float-type caliper may be employed. The caliper CPR is configured so as to pinch the rotary member (the brake disk) KTB via two of the friction members (the brake friction pads) MSB. The caliper CPR is configured to have a box-type structure. Specifically, the caliper CPR has a space in its inside, and various members (the drive circuit DRY and the like) are stored in the space. A portion of the caliper CPR having the box-type structure is called a case member CAS. The case member CAS is a portion of the caliper CPR and has a cavity in its inside. Incidentally, the caliper CPR and the case member CAS may be integrally formed or may be individually formed.

Inside the caliper CPR, the pressing member PSN (a brake piston) is driven (advances or retreats) so as to cause the friction member MSB to be pressed against the rotary member KTB which is fixed to the wheel WHL and rotates together with the wheel WHL. The friction member MSB is pressed against the rotary member KTB by driving the pressing member PSN, thereby generating a friction force. The pressing member PSN is an example of a pressing member of the present invention. For example, the pressing member PSN has a cylindrical shape and has a center axis Jps. Therefore, the pressing member PSN is driven in a direction of the center axis Jps.

The center axis Jps is also called a drive shaft. The pressing member PSN is driven by power of the electric motor MTR (a power source). Specifically, an output (rotary power around a motor shaft) of the electric motor MTR is transmitted to the shaft member SFT via the reduction gear GSK. Then, rotary power (torque around the shaft) of the shaft member SFT is converted into linear power (thrust of the pressing member in an axial direction) by a power conversion member NJB and is transmitted to the pressing member PSN. As a result, the pressing member PSN moves (advances or retreats) with respect to the rotary member KTB. Here, the center axis (the drive shaft) Jps of the pressing member PSN matches a rotary axis of the shaft member SFT. As the pressing member PSN moves, a force (a pressing force) of the friction member MSB pressing the rotary member KTB is adjusted. Since the rotary member KTB is fixed to the wheel WHL, a friction force is generated between the friction member MSB and the rotary member KTB, thereby adjusting a braking force of the wheel WHL.

The electric motor MTR is a power source to drive the pressing member PSN. The electric motor MTR is an example of an electric motor" of the present invention. For example, as the electric motor MTR, a motor with a brush or a brushless motor can be employed. In a rotation direction of the electric motor MTR, a normal direction of rotation corresponds to a direction in which the friction member MSB approaches the rotary member KTB (a direction in which a pressing force increases and braking torque increases), and a reverse direction of rotation corresponds to a direction in which the friction member MSB is separated away from the rotary member KTB (a direction in which a pressing force decreases and braking torque decreases). Electric power is supplied from the electric power sources BAT and ALT to the electric motor MTR via the electric power line PWL and the connector CNC.

The position acquisition unit MKA acquires (detects) a rotor position (a rotational angle) Mka of the electric motor MTR. For example, a rotational angle sensor configures the position acquisition unit MKA. Inside the position acquisition unit MKA, an electric circuit DMK (corresponds to a second electric circuit of the present invention) is included so as to convert a detected position Mka into an electrical signal, thereby transmitting the electrical signal. For example, the position acquisition unit MKA is provided in the electric motor MTR to be coaxial with the rotor and a commutator. That is, the position acquisition unit MKA is provided on a rotary axis of the electric motor MTR. The detected actual position (for example, the rotational angle) Mka is input to the drive circuit DRV (specifically, a processor CPUw in the drive circuit DRV).

The reduction gear GSK, the shaft member SFT, and the screw member NJB configure a power transmission mechanism to transmit power of the electric motor MTR to the pressing member PSN. From power of the electric motor MTR, the reduction gear GSK decreases a rotational speed and outputs it to the shaft member SFT. A rotational output (torque) of the electric motor MTR increases in accordance with a speed reduction ratio of the reduction gear GSK so that a rotational force (torque) of the shaft member SFT can be obtained. For example, the reduction gear GSK is a gear transmission mechanism and is configured to have a small diameter gear SKH and a large diameter gear DKH. As the reduction gear GSK, a winding transmission mechanism such as a belt and chain, or a friction transmission mechanism can be employed. The shaft member SFT is a rotary axis member and transmits rotational power which is transmitted from the reduction gear GSK, to the screw member NJB. The screw member NJB is the power conversion member (a rotational-linear power conversion mechanism) which converts the rotational power of the shaft member SFT into linear power. For example, as the screw member NJB, a sliding screw (a trapezoid-threaded screw and the like) or a rolling screw (a ball screw and the like) can be employed.

The pressing force acquisition unit (an axial force sensor) FBA acquires (detects) a force (a pressing force) Fba of the pressing member PSN pressing the friction member MSB. Inside the pressing force acquisition unit FBA, the electric circuit DFB (corresponds to a second electric circuit of the present invention) is included so that the pressing force acquisition unit FBA converts a detected pressing force Fba into an electrical signal, thereby transmitting the electrical signal. The detected actual pressing force Fba is input to the drive circuit DRV (specifically, the processor CPUw in the drive circuit DRY). For example, the pressing force acquisition unit FBA is provided between the shaft member SFT and the caliper CPR. That is, the pressing force acquisition unit FBA is provided on the rotary axis of the shaft member SFT and is fixed to the caliper CPR.

The drive circuit DRY is the electric circuit (the printed wiring board) which drives the electric motor MTR and corresponds to a second electric circuit of the present invention. In the drive circuit DRY, the processor (a central processing unit) CPUw and a bridge circuit HBR are provided. In the processor CPUw, a control unit CTL (a control algorithm) is programmed. The drive circuit DRV drives the electric motor MTR and controls the output thereof based on the target pressing force (the target signal) Fbt. The target signal Fbt is transmitted to the drive circuit DRV (the processor CPUw) from the electronic control unit ECU (the processor CPUb) via the signal line SGL and the connector CNC. A transmission path of the target signal Fbt is that the electronic control unit ECU (the target pressing force calculation block FBT) →the signal line SGL→the connector CNC→the signal line SGL→the drive circuit DRY (the processor CPUw). The drive circuit DRY is arranged inside (fixed to) the case member CAS (a portion of the caliper CPR). In an electrical path (an electric power system path), the drive circuit DRY is provided in the middle between the connector CNC and the electric motor MTR. Therefore, an electric power supplying path is that the electric power sources BAT and ALT→the electronic control unit ECU→the electric power line PWL (a first electric power line PWLa)→the connector CNC→the electric power line PWL (a second electric power line PWLb) →the drive circuit DRV (the bridge circuit HBR)→the electric power line PWL (a third electric power line PWLc)→the electric motor MTR".

The connector CNC is formed by fixing a metallic terminal by using an insulation member such as a resin. The connector CNC connects components to each other or connects wiring (a cable and a harness) and a component to each other, thereby transmitting and receiving electric power and/or a signal therebetween. Specifically, the connector CNC is provided in the case member CAS (a portion of the caliper CPR) on the wheel WHL side so as to relay at least one of the electric power line PWL and the signal line SGL. The connector CNC corresponds to a connector of the present invention. The connector CNC can be fixed thereto on the drive circuit DRV In order to minimize the number of the components, the connector CNC can serve for both supplying electric power (relaying the electric power line PWL) and transmitting a signal (relaying the signal line SGL).

Here, with reference to FIG. 2, the electric power line PWL, the signal line SGL, the connector CNC, the drive circuit DRV, and the electric motor MTR will be described in detail.

The electric power line PWL is a series of electrical paths to supply electric power to the electric motor MTR from the electric power sources BAT and ALT. The electric power line PWL is relayed by the connector CNC provided to the case member CAS. The electric power line PWL is configured to have an electric power line (the first electric power line) PWLa which is an electrical path from the electric power sources BAT and ALT to the connector CNC via the electronic control unit ECU, an electric power line (the second electric power line) PWLb which is an electrical path from the connector CNC to the drive circuit DRV, and an electric power line (the third electric power line) PWLc which is an electrical path in the drive circuit DRV as well as an electrical path from the drive circuit DRV to the electric motor MTR. As the first electric power line PWLa, a twisted-pair cable which is formed by twisting two electrical wires can be employed. In the twisted-pair cable, since emission of electromagnetic waves from the cable is minimized compared to a simple parallel cable, an influence of the electromagnetic waves on an electronic control system can be suppressed. At least one of the second electric power line PWLb and the third electric power line PWLc, a bus bar (a metallic bar which functions as an electric conductor) can be employed. Since the bus bar has a small wiring resistance, a voltage drop is small, and thus, the electric motor MTR can be efficiently driven. Moreover, since there is no need of insulation coating, the bus bar exhibits high heat dissipation, thereby making it possible to easily cope with a high current.

The signal line SGL is a series of signal transmission paths to transmit the target signal (a target pressing force) Fbt from the electronic control unit ECU (the first electric circuit) to the drive circuit DRV (the second electric circuit) to control the electric motor MTR. That is, the signal line SGL performs communication between the electronic control unit ECU (the first electric circuit) and the drive circuit DRV (the second electric circuit). The signal line SGL corresponds to a signal line of the present invention. The signal line SGL is relayed by the connector CNC provided to the case member CAS. As the signal line SGL, a serial communication bus can be employed. The serial communication bus employs a communication method in which data is transmitted by one bit in series within one communication path. For example, as the serial communication bus, a controller area network (CAN) bus can be employed. The signal line SGL is configured to have a communication line (a first signal line) SGLa which is a communication path from the processor CPUb (specifically, the target pressing force calculation block FBT programmed in the processor CPUb) of the electronic control unit ECU to the connector CNC, and a communication line (a second signal line) SGLb which is a communication path from the connector CNC to the processor CPUw (specifically, an instructed energizing amount calculation block IST and the like programmed in the processor CPUw) of the drive circuit DRV. Similarly to the electric power line PWL, as the communication line SGLb, a bus bar can be employed. The electric power line PWL and the signal line SGL are collectively called wiring (a cable and a harness).

The connector CNC is configured to have a combination of a first connector CN1 and a second connector CN2. The connector CNC relays both the electric power line PWL which supplies electric power and the signal line SGL which transmits a signal. The connector which relays the electric power line PWL and the connector which relays the signal line SGL can be individually provided. Therefore, the connector CNC relays at least one of the electric power line PWL and the signal line SGL. The connector CNC is provided on the surface of the case member CAS which is a portion of the caliper CPR.

The drive circuit DRV is the electric circuit (the printed wiring board) to drive the electric motor MTR and controls an energizing state to the electric motor MTR based on the target pressing force Fbt, thereby adjusting the output and the rotation direction of the electric motor MTR. The drive circuit DRY is configured to have the bridge circuit HBR, an energizing amount acquisition unit IMA, and the control unit CTL.

Figure 2:
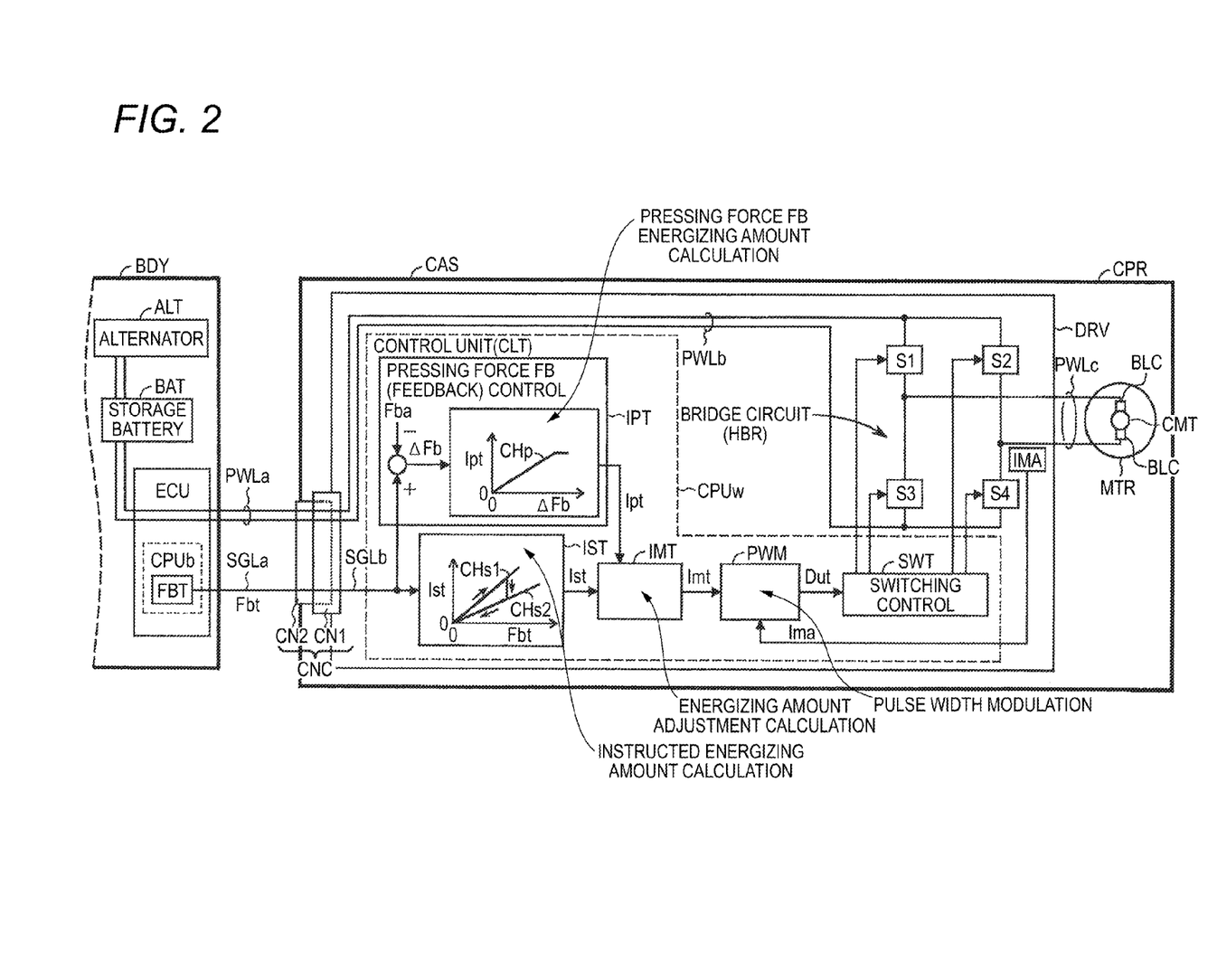
FIG. 2 is a functional block diagram showing an electric power line PWL, a signal line SGL, a connector CNC, a drive circuit DRV, and an electric motor MTR.

FIG. 2 shows an example of the drive circuit DRV when the motor with a brush (simply referred to as "brush motor") is employed as the electric motor MTR. The drive circuit DRV is configured to have the control unit CTL, the bridge circuit HBR, and the energizing amount acquisition unit IMA. The drive circuit DRV is stored inside the case member CAS which is a portion of the caliper CPR and is fixed thereto. The connector CNC is fixed to the drive circuit DRY and is electrically connected thereto via a bus bar (corresponding to the electric power line PWLb). The drive circuit DRV and the electric motor MTR are electrically connected to each other via a bus bar (corresponding to the electric power line PWLc).

The bridge circuit HBR is configured to have switching elements S1 to S4. The switching elements S1 to S4 are elements which can turn ON (energized) and turn OFF (non-energized) a portion of the electric circuit. For example, as the switching element, MOS-FET or IGBT is used. The bridge circuit HBR is a circuit requiring no bidirectional electric power source so that the energizing direction thereof to the electric motor is changed with a unidirectional electric power source, thereby making it possible to control the rotation direction (the normal direction of rotation or the reverse direction of rotation) of the electric motor. Specifically, the switching elements S1 to S4 are driven by the control unit CTL (a signal from a switching control block SWT), and a state of being energized/non-energized of each switching element is switched, thereby adjusting the rotation direction and output torque of the electric motor MTR. When the brushless motor is employed, the bridge circuit HBR is configured to have six switching elements. Similarly to the motor with a brush, based on a duty ratio Dut, the energized state/non-energized state of the switching element is controlled. In the brushless motor, the position acquisition unit MKA acquires the rotor position (the rotational angle) Mka of the electric motor MTR. Then, based on the actual rotor position Mka, the six switching elements configuring a three-phase bridge circuit are controlled. In accordance with the switching element, directions of coil energizing amount (that is, a magnetic excitation direction) for a U-phase, a V-phase, and a W-phase of the bridge circuit are sequentially switched, thereby driving the electric motor MTR. The rotation direction (the normal or reverse direction of rotation) of the brushless motor is determined by a relationship between a rotor and a position of magnetic excitation.

The energizing amount acquisition unit (for example, a current sensor) IMA is provided in the drive circuit DRV. The energizing amount acquisition unit IMA acquires (detects) the actual energizing amount (for example, a current actually flowing through the electric motor MTR) Ima to the electric motor MTR.

The control unit CTL controls the energizing state (eventually, the amount and the direction of a current) to the electric motor MTR based on the target pressing force (the target value) Fbt. The control unit CTL is the control algorithm and is programmed in the processor CPUw in the drive circuit DRV. The control unit CTL is configured to have the instructed energizing amount calculation block IST, a pressing force feedback control block IPT, an energizing amount adjustment calculation block IMT, a pulse width modulation block PWM, and the switching control block SWT.

The instructed energizing amount calculation block IST calculates an instructed energizing amount Ist based on the target pressing force Fbt and preset calculation characteristics (calculation maps) CHs1 and CHs2. The instructed energizing amount Ist is a target value for the energizing amount to the electric motor MTR in order to achieve the target pressing force Fbt. The calculation map of the instructed energizing amount Ist is configured to have two characteristics CHs1 and CHs2 in consideration of hysteresis of the braking unit BRK. The energizing amount is an amount of state (a variable) to control output torque of the electric motor MTR. In order to cause the electric motor MTR to output torque substantially proportional to a current, a current target value of the electric motor MTR can be used as the target value of the energizing amount. When a voltage supplied to the electric motor MTR is increased, the current thereof increases accordingly. Therefore, a supplied voltage value can be used as the target energizing amount. Moreover, since the supplied voltage value can be adjusted by a duty ratio of pulse width modulation, the duty ratio can be used as the energizing amount.

The pressing force feedback control block IPT calculates a pressing force feedback energizing amount Ipt based on the target pressing force (the target value) Fbt and an actual pressing force (actual value) Fba. The pressing force feedback energizing amount Ipt is calculated based on a deviation (a pressing force deviation) ΔFb between the target pressing force Fbt and the actual pressing force Fba, and the preset calculation characteristics (calculation maps) CHp. The instructed energizing amount Ist is calculated as a value corresponding to the target pressing force Fbt, but an error may occur between the target pressing force Fbt and the actual pressing force Fba due to efficiency fluctuation of the braking unit BRK. Then, the instructed energizing amount Ist is determined so as to reduce the above-described error. In the pressing force feedback control block IPT, in addition to the actual pressing force Fba acquired by the pressing force acquisition unit FBA, the rotor position Mka is utilized so as to be able to determine the final actual pressing force Fba. Specifically, displacement calculated based on the rotor position Mka is multiplied by a rigidity value Gcp (a value corresponding to rigidity of the caliper CPR and the friction member MSB), thereby calculating an estimated pressing force Fbe. Then, based on a detection value of the pressing force acquisition unit FBA and the estimated pressing force Fbe, the final actual pressing force Fba is calculated. For example, when K1 is a coefficient (a predetermined value), based on an expression such as Fba=K1×(the detection value of the pressing force acquisition unit FBA)+(1−K1)×Fbe, the final actual pressing force Fba can be calculated. Moreover, in the pressing force feedback control block IPT, based on only the rotor position Mka, a pressing force feedback control can be executed. Specifically, the estimated pressing force Fbe is calculated based on the rotor position Mka and the rigidity value Gcp (a spring constant of the caliper CPR and the like). Then, based on a deviation between the target pressing force Fbt and the estimated pressing force Fbe, the pressing force feedback energizing amount Ipt is calculated. In this case, the pressing force acquisition unit FBA can be omitted.

The energizing amount adjustment calculation block IMT calculates a target energizing amount Imt which is a final target value to the electric motor MTR. In the energizing amount adjustment calculation block IMT, the instructed energizing amount Ist is adjusted by the pressing force feedback energizing amount Ipt, thereby calculating the target energizing amount Imt. Specifically, with respect to the instructed energizing amount Ist, the pressing force feedback energizing amount Ipt is added so as to calculate as the final target energizing amount Imt. The rotation direction of the electric motor MTR is determined based on a sign (positive and negative of a value) of the target energizing amount Imt, and the output (the rotary power) of the electric motor MTR is controlled based on magnitude of the target energizing amount Imt. Specifically, when the sign of the target energizing amount Imt is a positive sign (the target energizing amount Imt>0), the electric motor MTR is driven in the normal direction of rotation (an increase direction of a pressing force), and when the sign of the target energizing amount Iint is a negative sign (the target energizing amount Imt<0), the electric motor MTR is driven in the reverse direction of rotation (a decrease direction of a pressing force). The electric motor MTR is controlled so as to have increased output torque as the absolute value of the target energizing amount but is increased, and is controlled so as to have decreased output torque as the absolute value of the target energizing amount Imt is decreased.

The pulse width modulation block PWM calculates an instruction value (target value) to perform the pulse width modulation (PWM) based on the target energizing amount Imt. Specifically, the pulse width modulation block PWM determines the duty ratio Dut (a time ratio of ON/OFF) of a pulse width based on the target energizing amount Imt and the preset characteristics (the calculation map). Additionally, the pulse width modulation block PWM determines the rotation direction of the electric motor MTR based on a sign (a positive sign or a negative sign) of the target energizing amount Imt. For example, the rotation direction of the electric motor MTR is set to have a positive (plus) value in the normal direction of rotation and a negative (minus) value in the reverse direction of rotation. Since the final output voltage is determined by an input voltage (an electric power source voltage) and the duty ratio Dut, the rotation direction of the electric motor MTR and the energizing amount (that is, the output of the electric motor MTR) to the electric motor MTR are determined in the pulse width modulation block PWM. Moreover, in the pulse width modulation block PWM, a so-called "current feedback control" can be executed. In this case, the detection value (for example, the actual current value) Ima of the energizing amount acquisition unit IMA is input to the pulse width modulation block PWM. Then, based on a deviation ΔIm between the target energizing amount but and the actual energizing amount Ima, the duty ratio Dut is corrected (finely adjusted). According to the current feedback control, a highly precise motor control can be achieved.

The switching control block SWT outputs drive signals to the switching elements (S1 to S4) configuring the bridge circuit HBR, based on the duty ratio (target value) Dut. The drive signal makes an instruction whether each switching element is to be in an energized state or a non-energized state.

Specifically, when the electric motor MTR is driven in the normal direction of rotation based on the duty ratio Dut, the switching elements S1 and S4 are in the energized states (ON state) and the switching elements S2 and S3 are in the non-energized states (OFF state). The states of energizing/non-energizing of the switching elements S1 and S4 are switched by energizing time (an energizing cycle) corresponding to the duty ratio Dut. Similarly, when the electric motor MTR is driven in the reverse direction of rotation, the switching elements S1 and S4 are controlled to be in the non-energized states (OFF state), and the switching elements S2 and S3 are controlled to be in the energized states (ON state). The energizing states (switching cycles of the ON/OFF state) of the switching elements S2 and S3 are adjusted based on the duty ratio Dut. Then, as the duty ratio Dut increases, the energizing time per unit time is lengthened, and thus, a larger current flows through the electric motor MTR.

As the electric motor MTR, the motor with a brush (the brush motor) can be employed. In the brush motor, a current flowing through an armature (a wire wound electromagnet) is switched in accordance with the rotary phase by a mechanical commutator CMT and a brush BLC. In the brush motor, the stator side has a permanent magnet and the rotor side has the wire wound circuit (the electromagnet). Then, the brush BLC abuts on the commutator CMT so as to supply electric power to the wire wound circuit (the rotor). The brush BLC is pressed against the commutator CMT by a spring (an elastic member), and thus, a current is commutated by rotating the commutator CMT. As the electric motor MTR, in addition to the motor with a brush, the brushless motor can be employed. In the brushless motor, in addition to the mechanical commutator CMT of the motor with a brush, a current is commutated by the electronic circuit. In the brushless motor, having a structure in which the rotor has a permanent magnet and the stator has a wire wound circuit (an electromagnet), the rotor position Mka is detected, and a supplying current is commutated by switching the switching element in accordance with the rotor position Mka.

Figure 3:
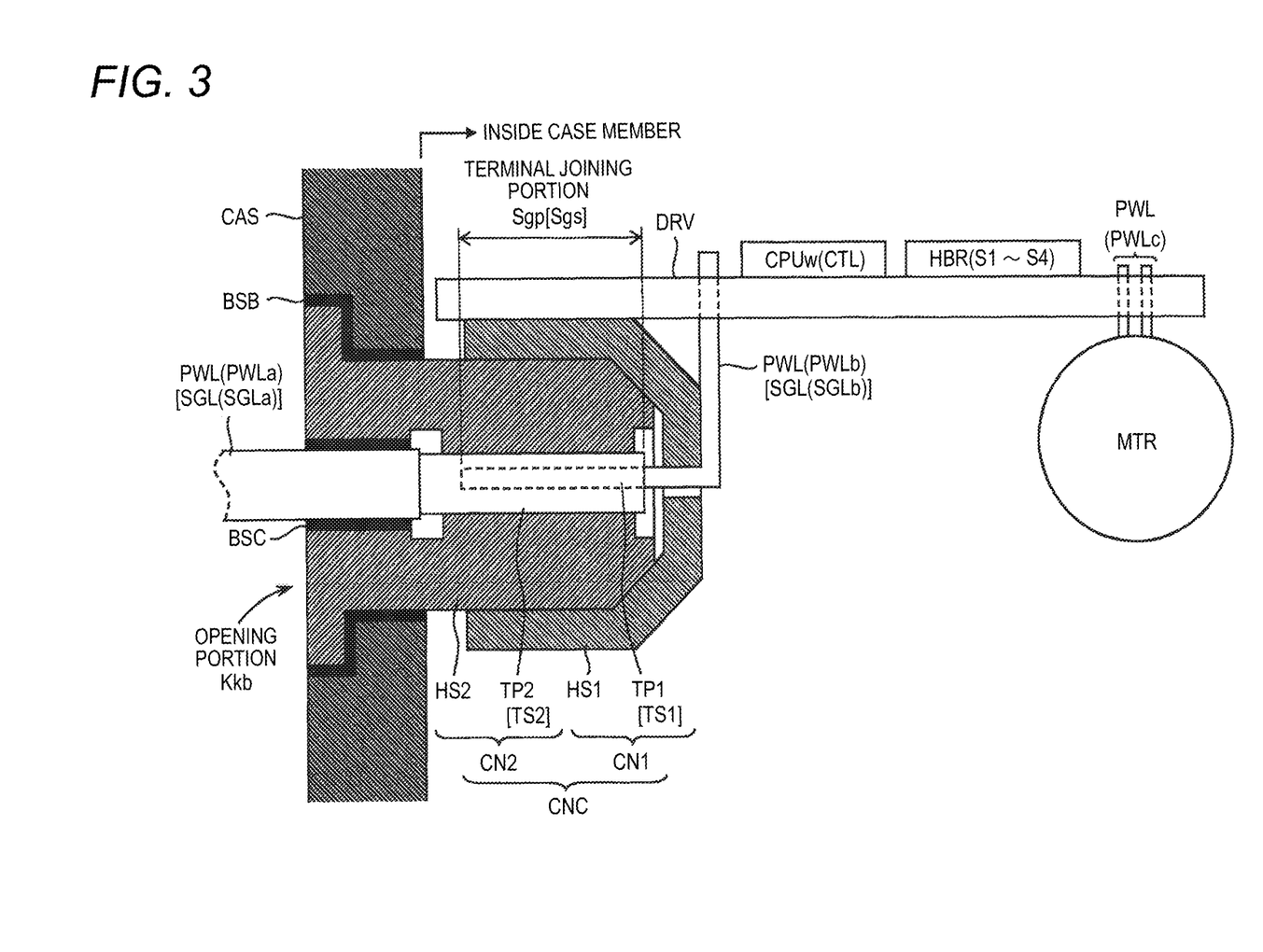
FIG. 3 is a cross-sectional view showing an arrangement state of the connector CNC in the first illustrative embodiment.

With reference to FIG. 3, descriptions will be given regarding the electric power line PWL and electric power supplying terminals TP1 and TP2 in a case where the connector CNC is in a first arrangement state (first illustrative embodiment). In addition, descriptions will be given regarding the signal line SGL and communication terminals TS1 and TS2 expressed within brackets. The connector CNC is configured by combining the first connector CN1 having a first terminal TP1 [TS1] and the second connector CN2 having a second terminal TP2 [TS2]. The first connector CN1 is configured to have the first terminal TP1 [TS1] and a first housing HS1. Similarly, the second connector CN2 is configured to have a second terminal TP2 [TS2] and a second housing HS2. In FIG. 3, as the first terminal TP1 [TS1], a male terminal (of which the joining portion has a convex shape, and which is also referred to as pin insertion terminal) is employed. As the second terminal TP2 [TS2], a female terminal (of which the joining portion has a concave shape, and which is also referred to as socket insertion terminal) is employed. In contrast, it is possible to employ configurations in which the first terminals TP1 (the electric power supplying metallic terminal) and TS 1 (the communication metallic terminal) are the female terminals, and the second terminals TP2 (the electric power supplying metallic terminal) and TS2 (the communication metallic terminal) are the male terminals. In the connector CNC (a combination of the first connector CN1 and the second connector CN2), a connector including the male terminal is referred to as a "male side connector", and a connector including the female terminal is referred to as a "female side connector".

The first (electric power supplying) terminal TP1 is formed in an end portion of the electric power line PWL (specifically, the second electric power line PWLb). The second (electric power supplying) terminal TP2 is formed in an end portion of the electric power line PWL (specifically, the first electric power line PWLa). Then, the first terminal TP1 and the second terminal TP2 both of which are made of metal are fit (are joined) to each other inside the case member CAS. A contact portion (joining portion) in which the first terminal TP1 and the second terminal TP2 come into contact with each other is a terminal joining portion Sgp. That is, the terminal joining portion Sgp is arranged inside the case member CAS.

The first (communication) terminal TS1 is formed in an end portion of the signal line SGL (specifically, the second communication line SGLb). The second (communication) terminal TS2 is formed in an end portion of the signal line SGL (specifically, the first communication line SGLa). Then, the first terminal TS1 and the second terminal TS2 both of which are made of metal are fit (are joined) to each other inside the case member CAS. A contact portion (joining portion) in which the first terminal TS 1 and the second terminal TS2 come into contact with each other is terminal joining portion Sgs. That is, the terminal joining portion Sgs is arranged inside the case member CAS.

The first connector CN1 (specifically, the first housing HS1) can be fixed to the drive circuit DRV. As the wiring PWLb [SGLb] connecting the first terminal TP1 [TS1] of the first connector CN1, and the drive circuit DRV, a bus bar can be employed. The second connector CN2 (specifically, the second housing HS2) is inserted (is introduced) into a space inside the case member CAS through an opening portion Kkb which is provided to penetrate the case member CAS, thereby fitting to the first connector CN1. Specifically, the first terminal TP1 [TS1] of the first connector CN1 is plugged into the second terminal TP2 [TS2] of the second connector CN2. Accordingly, the connector CNC is fit inside the case member CAS of the caliper CPR. That is, the terminal joining portions (the fit portions of the terminals) Sgp (the electric power supplying terminal) and Sgs (the signal transmission terminal) of the connector CNC are arranged inside the case member CAS. Here, the case member CAS is a portion of the caliper CPR and is a casing which has the box-type structure including a storing space therein.

Although small stones are kicked up due to rotations of the wheel WHL, without individually providing a protection cover (a protector) and the like, the caliper CPR itself (the case member CAS itself) becomes a protective member for the connector CNC. Moreover, since the terminal joining portions Sgp and Sgs are arranged inside the case member CAS instead of being arranged outside the caliper CPR, the size of a portion of the connector CNC exposed outside the caliper CPR can be suppressed to be minimum necessary, and thus, probability of damage to the connector CNC, particularly to the terminal joining portions Sgp and Sgs can remarkably be decreased. Since the terminal joining portions Sgp and Sgs are arranged inside the case member CAS, the terminal joining portions Sgp and Sgs can be apart from the surface of the caliper CPR which is a water-intrusion path. That is, it is possible to extend the length of the water-intrusion path through which water intrudes from the surface of caliper CPR to the terminal joining portions Sgp and Sgs through the opening portion Kkb of the case member CAS. As a result, water resistance of the terminal joining portions Sgp and Sgs can be improved.

A water-resistant member BSB can be provided between an inner peripheral portion of the opening portion Kkb of the case member CAS and an outer peripheral portion of the connector CNC. As the water-resistant member BSB, an elastomer (for example, rubber) can be employed. When flying stones and the like collide with the elastomer, a partial cut may occur. The waterproofing is not performed outside the case member CAS and the sealing is performed by using the water-resistant member BSB provided between at least the inner peripheral portion of the opening portion Kkb of the case member CAS and the outer peripheral portion of the connector CNC, and thus, damage to the water-resistant member BSB due to flying stones and the like can be suppressed.

Further, the connector CNC (specifically, an end surface of the second connector CN2) is provided to have no step with respect to the surface of the case member CAS. That is, an end surface of the connector CNC (specifically, the second housing HS2) and the surface of the case member CAS are configured to have no step to each other in a flat state. Water is easily accumulated in a recess and the like on the surface of the case member CAS. However, the end surface of the connector CNC and the surface of the caliper form a stepless or flash surface so as to be easily dried without accumulating water even when the case member CAS is wet. The connector CNC (particularly, the second housing HS2) and the wiring PWL and SGL are sealed (tightly closed) by a water-resistant member BSC. On the drive circuit DRV, the processor CPUw and the bridge circuit HBR are provided. The electric motor MTR is connected to the drive circuit DRV via the electric power line PWLc (for example, a bus bar). The drive circuit DRV and the electric motor MTR are fixed inside the case member CAS and stored therein.

Figure 4:
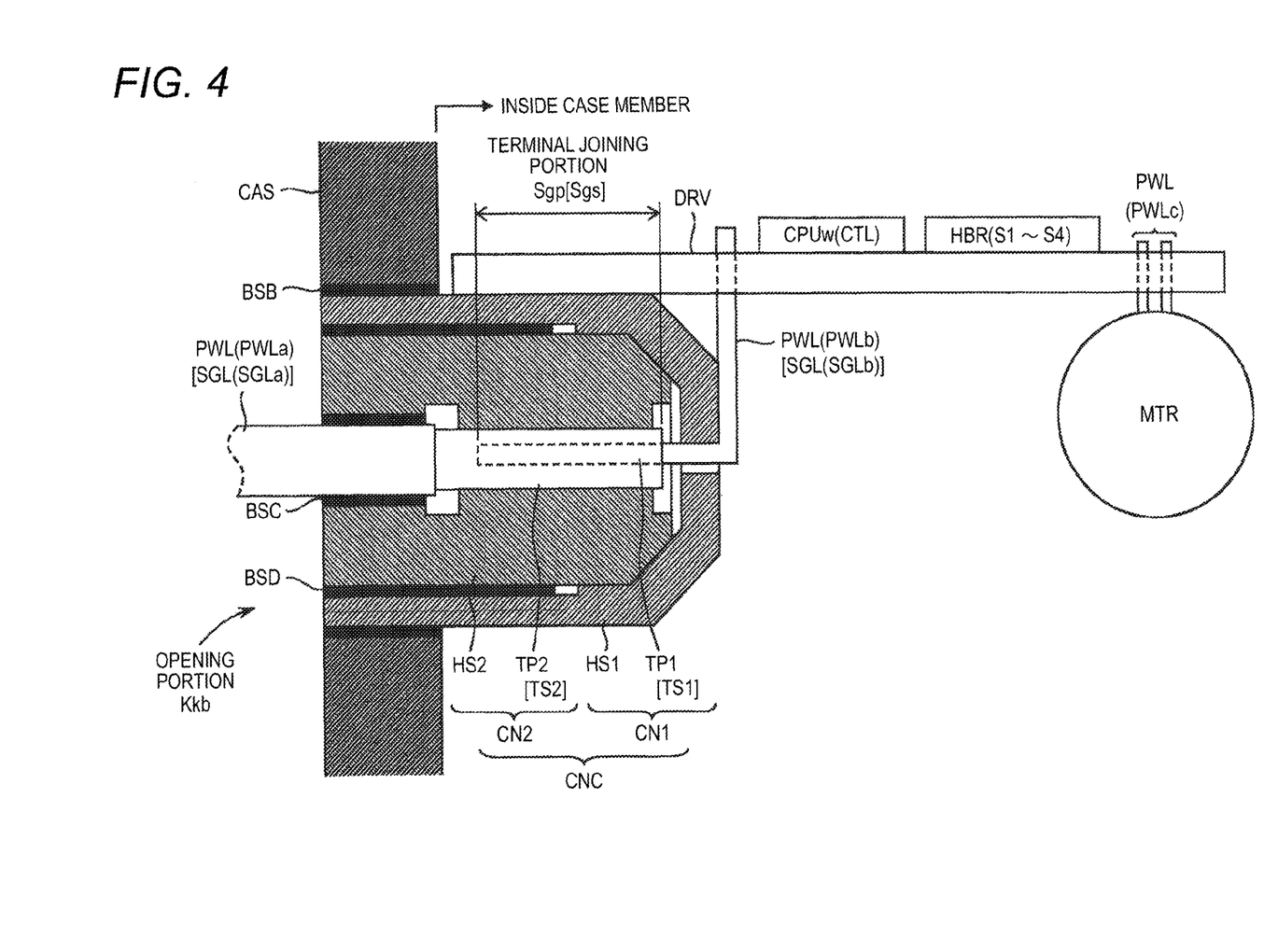
FIG. 4 is a cross-sectional diagram showing another arrangement state of the connector CNC in a modified illustrative embodiment.

Similarly to the case in FIG. 3, with reference to FIG. 4, descriptions will be given regarding members related to the electric power line PWL in a case where the connector CNC is in a second arrangement state (modified illustrative embodiment). In addition, descriptions will be given regarding the signal line SGL expressed within brackets. For example, the terminal joining portion Sgp [Sgs] indicates the terminal joining portion Sgp between the first terminal TP1 and the second terminal TP2 for electric power lines, and the terminal joining portion Sgs between the first terminal TS1 and the second terminal TS2 for communication lines, respectively.

In the modified illustrative embodiment, the relationship between the connector CNC and the case member CAS differs from that in the first illustrative embodiment. Specifically, the first connector CN1 is fixed to the drive circuit DRV, and the first connector CN1 is inserted into the opening portion Kkb of the case member CAS. Then, the water-resistant member BSB is provided between the outer peripheral portion of the first connector CN1 and the inner peripheral portion of the opening portion Kkb. The second connector CN2 is fit to the first connector CN1. A water-resistant member BSD is provided between the inner peripheral portion of the first connector CN1 and the outer peripheral portion of the second connector CN2. Here, both end surfaces of the first connector CN1 and the second connector CN2 can be caused to have no step so as to be flat with respect to the surface of the case member CAS. The modified illustrative embodiment exhibits the same effect as that in the first illustrative embodiment as well. That is, the case member CAS protects the terminal joining portions Sgp and Sgs for water-sealing, and protects the connector CNC and the water-resistant member BSB.

Figure 5:
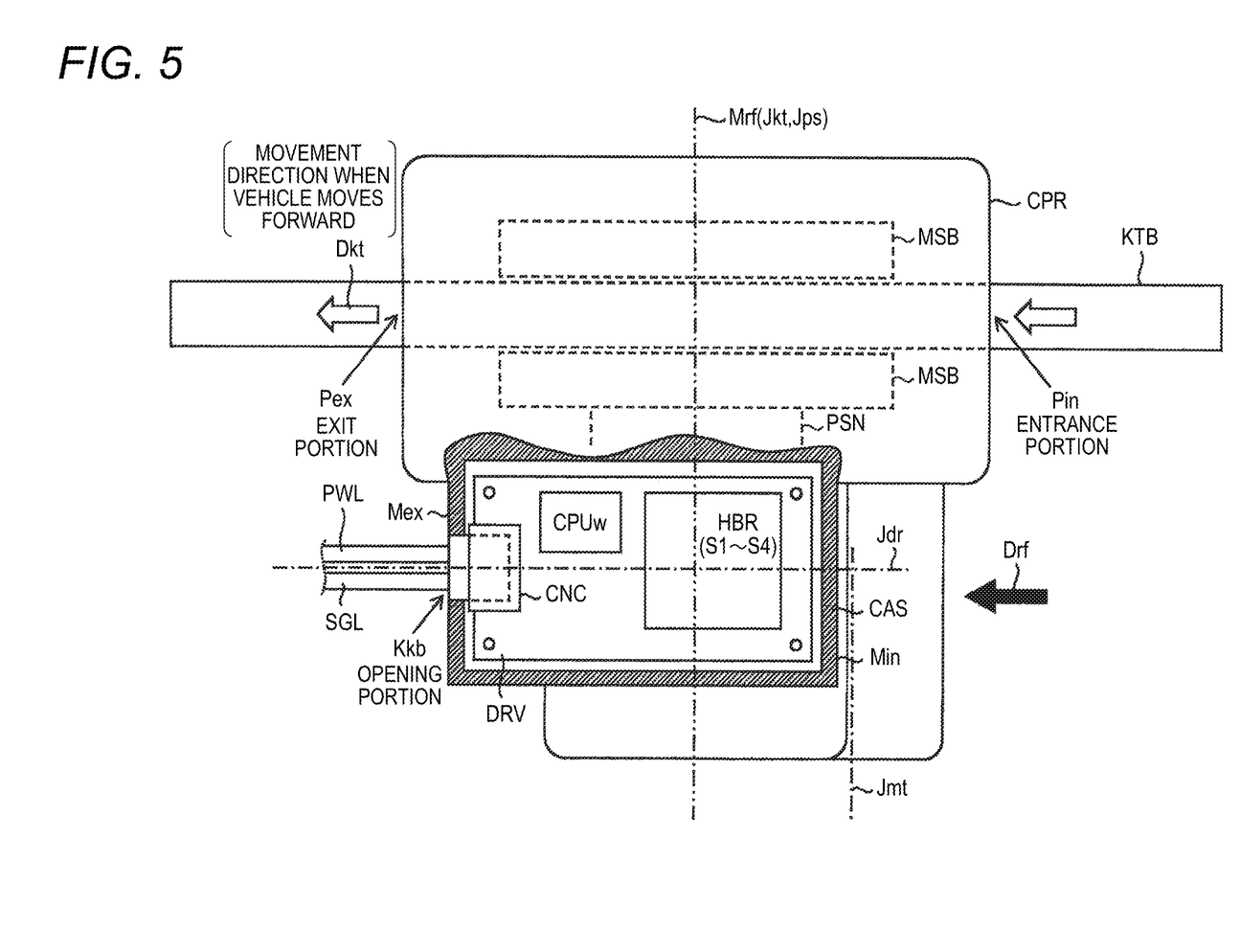
FIG. 5 is a cross-sectional diagram showing a mounting state of the connector CNC and the drive circuit DRV to a caliper CPR.

With reference to FIG. 5, descriptions will be given regarding an arrangement of the connector CNC with respect to the rotation direction of the rotary member KTB. The rotary member KTB is pinched by the caliper CPR. FIG. 5 shows a partial cross section of a rotary axis Jkt (the same as the rotary axis of the wheel WHL) of the rotary member KTB when viewed being apart therefrom in a direction of the rotary axis Jkt. The center axis (the drive shaft) Jps of the pressing member PSN having the electric motor MTR as a power source and moving linearly moves (slides) with respect to the rotary member KTB is parallel to the rotary axis Jkt of the rotary member KTB. A plane Mrf formed by the center axis (the drive shaft) Jps and the rotary axis Jkt is defined as a reference plane. When a vehicle moves forward, in the rotation direction of the rotary member KTB (indicated by the arrow Dkt), a portion (a section) where the rotary member KTB enters the caliper CPR is referred to as an "entrance portion Pin", and a portion where the rotary member KTB escapes from the caliper CPR is referred to as an "exit portion Pex". Further, when the caliper CPR is divided into half by the reference plane Mrf, a side where the entrance portion Pin is present is referred to as an "entrance side" and a side where the exit portion Pex is present is referred to as an "exit side".

In the case member CAS which is a portion of the caliper CPR, the connector CNC is positioned on the exit side with respect to the reference plane Mrf, and provided on a certain plane (also referred to as "exit plane Mex") Mex which is present in a region hidden on the reference plane Mrf when viewed in a direction perpendicular (indicated by the arrow Drf) to the reference plane Mrf from the entrance side. That is, when the reference plane Mrf is viewed from the entrance side, the connector CNC is arranged on the exit plane Mex positioned at the rear of the reference plane Mrf. For example, in the case member CAS, the connector CNC can be installed on the certain plane Mex on the exit side which does not intersect with the reference plane Mrf. Here, it is possible to employ a configuration in which the caliper CPR and the case member CAS are integrally formed. Alternatively, it is possible to employ a configuration in which the caliper CPR and the case member CAS are in separate bodies so as to be individually combined with each other. The case member CAS has a space therein (has a cavity inside thereof), and members are arranged in the space. That is, the case member CAS has the box-type structure.

Small stones, water, dirt, and the like on the road are kicked up due to rotations of wheels and flies to the caliper CPR. However, since the connector CNC is fixed to the certain plane (the exit plane) Mex of the case member CAS, the case member CAS itself becomes a protective wall to protect the connector CNC from the kicked-up substances. Specifically, although small stones, water, dirt, and the like on the road are caught up in the rotation direction of the wheel and fly in all directions, since the substances are blocked by the case member CAS (particularly, by the entrance plane Min), small stones are unlikely to fly to the exit plane Mex (a rear plane of the entrance plane Min) and water spray is also unlikely to be scattered thereto. Therefore, probability of damage to the connector CNC due to flying stones is decreased, and water resistance of the connector CNC can be improved. Moreover, the length of an axis (for example, the length in a direction along the reference plane Mrf) of the caliper CPR (the case member CAS) can be suppressed from extending.

The drive circuit DRV has an axially symmetrical shape, and the connector CNC is fixed thereto on a symmetrical axis Jdr. Here, the drive circuit DRV is a printed wiring board which is a plate-like component configuring an electronic circuit by fixing electronic components such as an integrated circuit, a resistor, and a capacitor to the surface thereof and connecting the electronic components through wiring. In the drive circuit DRV, it is necessary that only the board shape is axially symmetric, and it is not required that an arrangement of the processor CPUw and the bridge circuit HBR (the switching elements S1 to S4) provided on the printed wiring board is axially symmetric. In order to mount the braking unit BRK on right and left wheels in the same form, it is necessary to cause the braking unit BRK for the right wheel and the same for the left wheel to be symmetric with respect to the center axis of a vehicle. That is, it is required that the drive circuit for the left wheel and the drive circuit for the right wheel are individually configured. The drive circuit DRV has the axially symmetrical shape (for example, rectangular), and the connector CNC is fixed thereto on the symmetrical axis Jdr of the drive circuit DRV. Therefore, the drive circuit DRV can be commonly used for the right and left wheels thereby making it possible to cope with the calipers CPR of the right and left wheels without increasing the number of components. Here, the "axially symmetrical" refers to symmetry in which a figure overlaps itself when inverted about a certain straight line as the axis. In this case, "a certain line" is the symmetrical axis.

Figure 6:
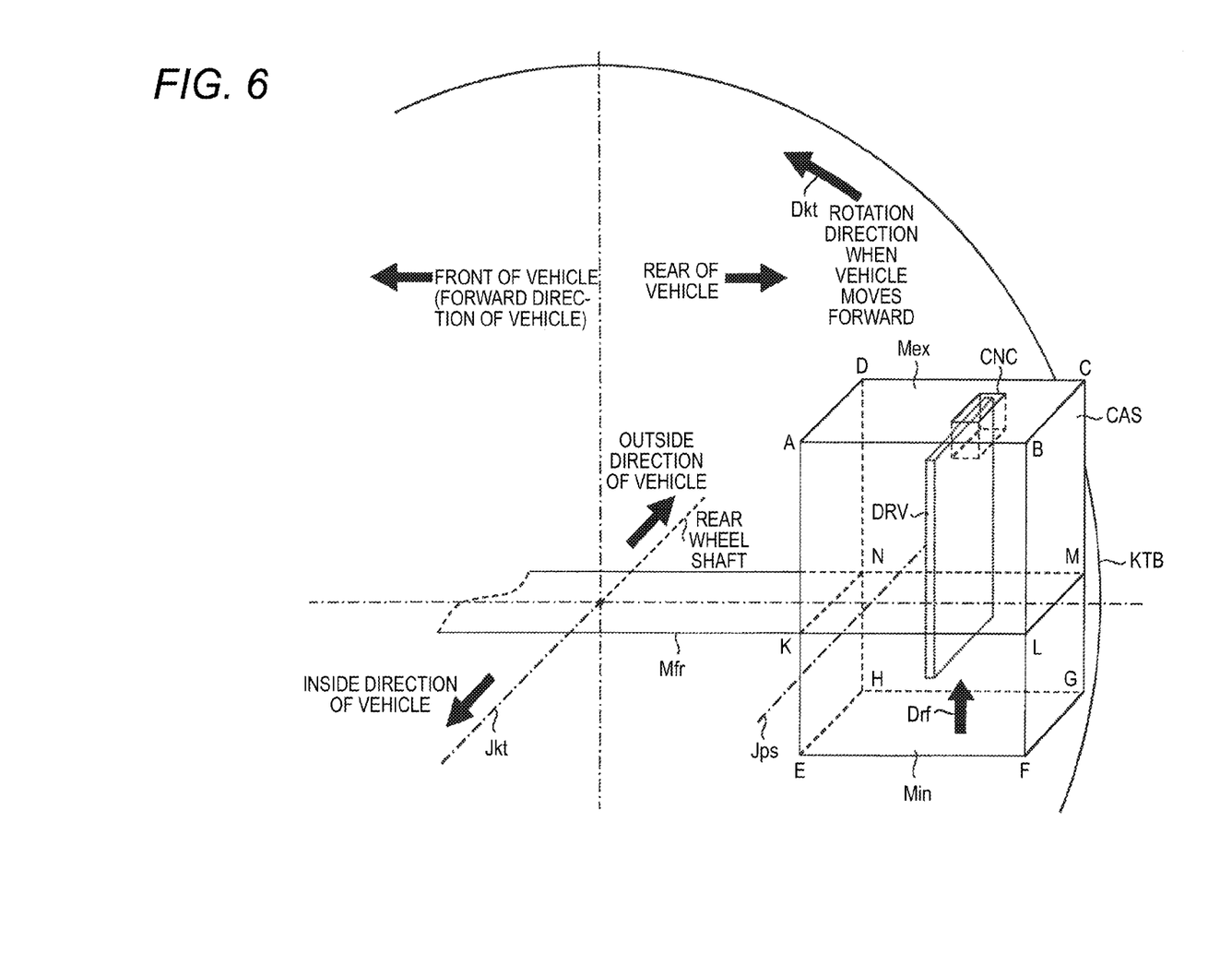
FIG. 6 is a schematic diagram showing relative relationships among a rotary member KTB, a case member CAS, a reference plane Mrf and the connector CNC when the electric braking device is mounted on a left rear wheel of a vehicle.

With reference to FIG. 6, descriptions will be given regarding relative relationships among the rotary member KTB, the case member CAS, the reference plane Mrf, and the connector CNC when the electric braking device is mounted on a left rear wheel of a vehicle. The caliper CPR is configured to pinch the rotary member KTB. The case member CAS which is a portion of the caliper CPR is simplified so as to be indicated as a rectangular parallelepiped A-B-C-D-E-F-G-H. By the reference plane Mrf which is formed by the rotary axis Jkt of the rotary member KTB, and the center axis Jps (the axis parallel to the rotary axis Jkt) of the pressing member PSN, the case member CAS is divided into half. Out of the case members CAS divided into half, when a vehicle moves forward, in the rotation direction of the rotary member KTB (indicated by the arrow Dkt), a side where the rotary member KTB enters the caliper CPR is referred to as an "entrance side", and a side where the rotary member KTB escapes from the caliper CPR is referred to as an "exit side". The connector CNC is provided on a certain plane (which is a plane A-B-C-D and is the exit plane Mex) of the case member CAS which is present on the escape side (a rectangular parallelepiped A-B-C-D-K-L-M-N) and does not intersect (has no intersection line) the reference plane Mrf (a plane K-L-M-N). That is, the connector CNC does not intersect the reference plane Mrf formed by the rotary axis Jkt of the rotary member KTB and the center axis Jps of the pressing member PSN. With respect to the reference plane Mrf, the connector CNC is arranged on the certain plane (the exit plane) Mex of the case member CAS which is positioned on the side (the exit side) where the rotary member KTB escapes from the caliper CPR in the rotation direction Dkt of the rotary member KTB when a vehicle moves forward. The certain plane (the exit plane) Mex is a region hidden on a rear side of the reference plane Mrf when viewed in a direction perpendicular (indicated by the arrow Drf) to the reference plane Mrf from the entrance side, out of the surfaces of the caliper CPR, specifically the surfaces of the case member CAS.

A geometrical relationship will be described in detail. The surfaces of the case member CAS correspond to six surfaces of the rectangular parallelepiped A-B-C-D-K-L-M-N (a plane A-B-C-D, a plane B-C-G-F, a plane A-B-F-E, a plane A-D-H-E, a plane D-C-G-H, and a plane E-F-G-H). Then, planes intersecting the reference plane Mrf are the plane B-C-G-F, the plane A-B-F-E, the plane A-D-H-E, and the plane D-C-G-H. However, the connector CNC is not arranged on those planes. The surfaces of the case member CAS which do not intersecting the reference plane Mrf are the plane A-B-C-D and the plane E-F-G-H. However, the connector CNC is installed on the plane A-B-C-D, but is not installed on the plane E-F-G-H. That is, the connector CNC does not intersect the reference plane Mrf (a plane configured by the rotary axis Jkt of the rotary member KTB and the center axis Jps of the pressing member PSN). With respect to the reference plane Mrf, the connector CNC is positioned on the side where the rotary member KTB escapes from the caliper CPR in the rotation direction of the rotary member KTB when a vehicle moves forward. The connector CNC is arranged on the certain plane Mex (the plane A-B-C-D) of the case member CAS which is a hidden region when viewed in a normal direction of the reference plane Mrf from the side where the rotary member KTB enters the caliper CPR in the rotation direction Dkt of the rotary member KTB when a vehicle moves forward.

Due to rotations of the wheel WHL, small stones, water, and the like on the road are caught up in the rotation direction (indicated by the arrow Dkt in the drawing) thereof. Then, most of the substances caught up initially collide with the entrance plane Min (the plane E-F-G-H). Therefore, the substances caught up due to rotations are unlikely to collide with the certain plane (exit plane) Mex (the plane A-B-C-D which is the rear plane of the plane E-F-G-H, with respect to the rotation direction of the rotary member KTB). Since the connector CNC is arranged on the exit plane Mex, damage to the connector CNC due to flying stones and water-intrusion to the connector CNC can be suppressed.

In a view point of mounting the braking unit BRK on a vehicle, although there is relatively some room in the rotation direction of the wheel WHL, it is desirable that dimensions of the surroundings of the rotary axis Jkt and the rotary axis Jkt direction be minimized. This is because a hub bearing unit which axially supports the wheel WHL is present around the rotary axis Jkt, and a suspension member which suspends the wheel WHL is present in the rotary axis Jkt direction. For example, when sets of the wiring PWL and SGL are drawn out from the plane A-D-H-E, there is a need to consider interference between the wiring PWL and SGL, and the hub bearing unit. When the wiring PWL and SGL are drawn out from the plane A-B-F-E, there is a need to consider interference between the wiring PWL and SGL, and the suspension member. Moreover, when the wiring PWL and SGL are drawn out from the plane B-C-G-F, the wiring PWL and SGL interfere with an inner side of the wheel WHL. Since the connector CNC is arranged on the certain plane (the exit plane) Mex (the plane A-B-C-D) and the sets of the wiring PWL and SGL are drawn out from the certain plane Mex, the size of the braking unit BRK in the rotary axis Jkt direction can be minimized.

In the braking unit BRK for rear wheels, the center axis Jps of the pressing member PSN can be arranged on the same horizontal plane as the rotary axis Jkt, or slightly upper than the rotary axis Jkt. The caliper CPR (the case member CAS) can be arranged farther rear than the rotary axis Jkt (that is, a rear wheel shaft). Specifically, with reference to a plane perpendicular to the horizontal plane including the rear wheel shaft, the caliper CPR is positioned at the rear with respect to the forward direction of a vehicle. In such an arrangement, the exit plane Mex is present above the entrance plane Min (that is, positioned at a higher place). Therefore, even when a vehicle enters a deep puddle, it is possible to suppress a probability that a portion of the connector CNC is soaked, and to ensure water resistance of the connector CNC.

Figure 7:
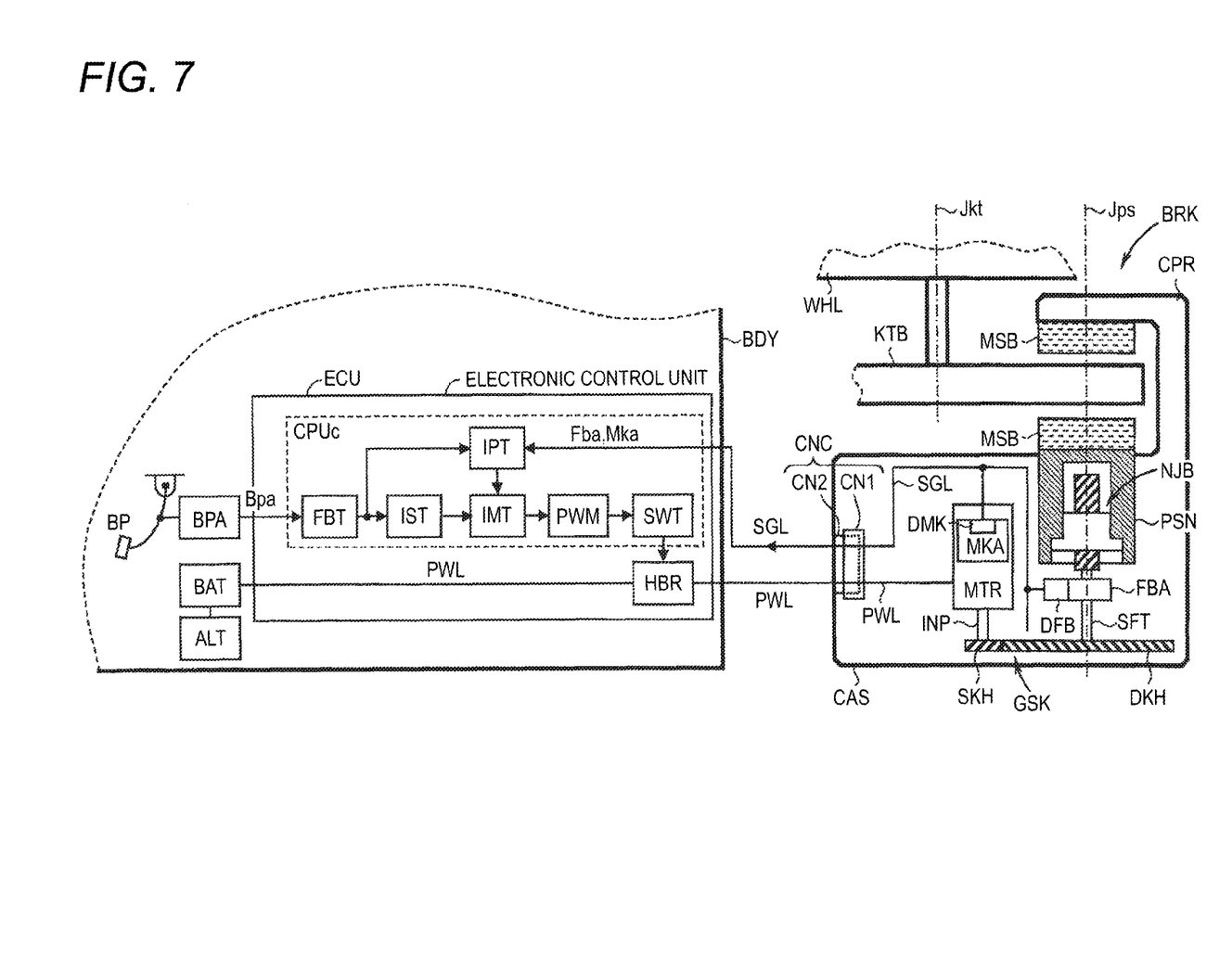
FIG. 7 is an overall configuration diagram showing an electric braking device according to a second illustrative embodiment.

To the first illustrative embodiment of the electric braking device shown in FIGS. 1 to 6, it is possible to employ the electric braking device (the second illustrative embodiment) shown in FIG. 7. In FIG. 7, descriptions for the contents (various members, calculation blocks, and the like) having the same reference numerals and signs as those in FIGS. 1 to 6 will be omitted, for having the similar functions, and differences therebetween will be described.

The main difference in the second illustrative embodiment with respect to the first illustrative embodiment is a functional arrangement of the drive circuit DRV. Specifically, in the first illustrative embodiment, the drive circuit DRV is provided inside the caliper CPR. In contrast, in the second illustrative embodiment, functions of the drive circuit DRY are arranged inside an electronic control unit ECV provided on the vehicle body side. Therefore, signals and the like transmitted via the connector CNC are different. In the second illustrative embodiment, at least one of the actual pressing force Fba and the actual position (the rotational angle) Mka is transmitted from the wheel side to the electronic control unit ECV (specifically, a processor CPUc inside the electronic control unit ECV) via the signal line SGL and the connector CNC. Here, the electronic control unit ECV corresponds to a first electric circuit of the present invention.

The pressing force acquisition unit FBA is provided with the electric circuit DFB which converts an output of the pressing force acquisition unit FBA into a signal (for example, an electrical signal, an optical signal, and the like). The electric circuit DFB corresponds to a second electric circuit of the present invention. Similarly, the position acquisition unit MKA is also provided with the electric circuit DMK (corresponding to a second electric circuit of the present invention) which converts an output of the position acquisition unit MKA into a signal. The second electric circuits DFB and DMK are fixed inside the caliper CPR. The signals Fba and Mka converted by the second electric circuits DFB and DMK are transmitted to the electronic control unit ECV through the signal line SGL. In the second illustrative embodiment, the terminal joining portions Sgp and Sgs of the connector CNC are arranged inside the case member CAS. As a result, the same effect as that in the first illustrative embodiment is exhibited.

While the present invention has been shown and described with reference to certain illustrative embodiments thereof, it will be understood by those skilled in the art that various changes in form and details may be made therein without departing from the spirit and scope of the invention as defined by the appended claims.

In the above-described illustrative embodiments, descriptions are given regarding a case where both the electric power line PWL and the signal line SGL are relayed by one common connector CNC. However, in the present invention, the connector relaying the electric power line PWL and the connector relaying the signal line SGL can be individually configured.

Based on the disclosure of the above-described illustrative embodiments or various modified illustrative embodiments, the present invention can employ the following configurations.

(Configuration 1)

In the present invention, it is possible to employ a configuration (Configuration 1) in which the electric braking device includes a water-resistant member (BSB) between an inner peripheral portion of the opening portion (Kkb) of the case member (CAS) and an outer peripheral portion of the connector (CNC).

In Configuration 1, as a material of the water-resistant member (BSB), an elastomer (for example, rubber) can be generally employed. Although an elastomer has elasticity, a partial cut may occur when flying stones and the like collide with the elastomer. The water-resistant member (BSB) is used to seal the inner peripheral portion of the opening portion (Kkb) of the case member (CAS), and thus, it is possible to suppress damage due to collision of flying stones and the like.

(Configuration 2)

In the present invention, it is possible to employ another configuration (Configuration 2) in which the connector (CNC) is provided to have no step with respect to the surface of the case member (CAS).

In Configuration 2, the connector CNC, specifically a rear surface of the second housing (HS2) and the surface of the case member (CAS) are configured to form a stepless (or flash) surface (stepless (or flash), that is, a state having no step difference between two surfaces so as to be flat). According to this configuration, since the rear surface of the connector and the surface of the caliper are in the stepless (or flash) state after the connector (CNC) is fit thereto, even though water is splashed, it is easily dried without accumulating water. As a result, water resistance of the electric braking device can be improved.

(Configuration 3)

In the present invention, it is possible to employ still another configuration (Configuration 3) in which the electric braking device includes the drive circuit (DRV) which adjusts an output of the electric motor (MTR), the connector (CNC) is configured to have one connector member (CN1) and the other connector member (CN2), the one connector member (CN1) is fixed to the drive circuit (DRV), and the electric power line (PWLb) which is an electrical path from the one connector member (CN1) to the drive circuit (DRY), out of the electric power lines (PWL) is a bus bar.

In Configuration 3, the drive circuit (DRV) of the electric motor (MTR) is provided inside the case member (CAS), and the one connector member (CN1) is fixed thereto on the drive circuit (DRV). Moreover, as the electric power line (PWLb) which is the electrical path from the one connector member (CN1) to the drive circuit (DRY), the bus bar (a metallic bar which functions as an electric conductor) can be employed. Since the bus bar is compact and has a large energizing volume, it is possible to efficiently control the electric motor (MTR).

What is claimed is:

1. An electric braking device for a vehicle, which is configured to generate braking torque on a wheel of the vehicle, the electric braking device comprising:
   a brake caliper which is provided to the wheel;
   a pressing member which is provided to the brake caliper and is configured to be driven to press a friction member to a rotary member which is fixed to the wheel and rotates together with the wheel;
   an electric motor which is a power source to drive the pressing member;
   an electric power line which is configured to supply electric power to the electric motor from an electric power source which is fixed to a vehicle body of the vehicle; and
   a connector which is configured to relay the electric power line,
   wherein the connector includes a terminal joining portion which joins one terminal of the electric power line and another terminal of the electric power line to each other, such that the one terminal and the another terminal are in contact with each other across a length of the terminal joining portion, the one terminal and the another terminal being made of metal, and wherein the terminal joining portion is positioned inside the brake caliper.

2. The electric braking device according to claim 1, wherein the brake caliper includes a case member which has a space to accommodate the terminal joining portion, and wherein the terminal joining portion is configured by joining the another terminal which is introduced to the space of the case member through an opening portion provided to penetrate the case member, to the one terminal which is arranged in the space of the case member.

3. An electric braking device for a vehicle, which is configured to generate braking torque on a wheel of the vehicle, the electric braking device comprising:

a brake caliper which is provided to the wheel;

a pressing member which is provided to the brake caliper and is configured to be driven to press a friction member to a rotary member which is fixed to the wheel and rotates together with the wheel;

an electric motor which is a power source to drive the pressing member;

a signal line which allows a first electric circuit provided in a vehicle body of the vehicle to communicate with a second electric circuit provided in the brake caliper; and a connector which is configured to relay the signal line, wherein the connector includes a terminal joining portion which joins one terminal of the signal line and another terminal of the signal line to each other, such that the one terminal and the another terminal are in contact with each other across a length of the terminal joining portion, the one terminal and the another terminal being made of metal, and wherein the terminal joining portion is positioned inside the brake caliper.

4. The electric braking device according to claim 3, wherein the brake caliper includes a case member which has a space to accommodate the terminal joining portion, and wherein the terminal joining portion is configured by joining the another terminal which is introduced to the space of the case member through an opening portion provided to penetrate the case member, to the one terminal which is arranged in the space of the case member.

\* \* \* \* \*